Patented July 31, 1951

2,562,865

UNITED STATES PATENT OFFICE 2,562,865

THEOBROMINE ALKALINE EARTH METAL LEVULINATES

Charles J. Kern, Long Island City, and Henry W. Del Vecchio, Brooklyn, N. Y., assignors to American Home Products Corporation, New York, N. Y., a corporation of Delaware No Drawing. Application December 11, 1948, Serial No. 64,896

2 Claims. (Cl. 260—253.)

This invention relates to the preparation of a diuretic and cardio-active compound and more particularly relates to the preparation of alkaline earth metal double salts containing theobromine.

Alkali metal theobromine salts, such as theobromine sodium formate, acetate or lactate or theobromine sodium salicylate have been used or suggested as cardio-active agents and as diuretics, but these compounds are highly soluble, and have proved to be quite irritating in the stomach. Other known theobromine compounds have been suggested but the cost of manufacture is high due either to the cost of the starting materials or due to the relatively low yields obtained. The compounds of the invention are prepared from relatively inexpensive starting materials and are highly effective diuretics and cardio-active agents.

An object of the invention, therefore, is to obtain compounds useful in the treatment of cardiac disorders and diseases of like nature which are stable and relatively non-hygroscopic and which are non-toxic and non-irritating in the amounts used.

A further object is to obtain orally effective compounds useful as diuretics.

Further objects will become apparent to those skilled in the art from the disclosure appearing herein.

It has been discovered that non-toxic alkaline earth metal salts of theobromine and levulinic acid are highly effective as diuretics and also as cardio-active agents, acting specifically as vasodilators.

In the preparation of these theobromine alkaline earth metal levulinates, and as a specific example thereof, theobromine calcium levulinate, the yields are substantially quantitative, are readily duplicated at all times and the losses are practically nil. The compounds are extremely stable at room and elevated temperatures and are non-hygroscopic in nature.

Theobromine alkaline earth metal levulinates may be prepared by reacting theobromine with an alkaline earth metal salt in an alkaline environment to form the corresponding alkaline earth metal salt of theobromine. This may then be separately reacted with an alkaline earth metal salt of levulinic acid, the final desired product being isolated and dried.

Other procedures for the preparation of the compounds of the invention involve reacting a mixture of theobromine, a selected alkaline earth metal oxide and either an alkaline earth metal salt of levulinic acid or merely using levulinic acid itself.

While, in general, any substantially non-toxic and non-irritating alkaline earth metal salt of levulinic acid and theobromine is contemplated as falling within the scope of the invention, a particularly preferred compound because of its many advantages is the calcium salt, namely, theobromine calcium levulinate. Equally effective but somewhat less advantageous because of cost is theobromine strontium levulinate.

The following examples illustrate methods for preparing a specific theobromine salt but it is to be clearly understood that these examples are not to be regarded as limitative but merely illustrative of the invention.

Example I 50 grams of theobromine may be dissolved in 75 cc. of an aqueous solution containing 12 grams of sodium hydroxide. To this may be added a solution containing 16 grams of anhydrous calcium chloride in 75 cc. of water. After allowing the mixture of solutions to stand overnight, the dense white precipitate of calcium theobromine is filtered and washed several times with distilled water and dried at or under 100° C. To the dried powder, add 43 grams of calcium levulinate, mix intimately with 10 cc. of distilled water. Allow to stand one to two hours and dry at or below 100° C.

The theobromine calcium levulinate product is a white granular amorphous powder. It has limited solubility in water, 0.1 gram being incompletely soluble in 5 ml. of water at room temperature. An increase in solubility is obtained when heated to boiling, but it is still not entirely soluble. It is alkaline to phenolphthalein, a 10% suspension in water having a pH of about 10.5 at 24° C.

Example II 4.7 grams of powdered C. P. calcium oxide, 30 grams of theobromine and 25.3 grams of calcium levulinate may be intimately mixed and 70 cc. of distilled water added to the mixture. The resultant paste may then be intimately mixed. When the reaction is completed as evidenced by a hardened mass which takes place within 5 to 10 minutes, the mixture is evaporated to dryness on a steam bath and then in the oven at or below 100° C. The product appeared to have substantially the same characteristics as indicated in Example I.

*Example III*

10 grams of C. P. calcium oxide powder, 30 grams of theobromine and 20 grams of levulinic acid may be mixed intimately with 10 cc. of distilled water. After the reaction has subsided the paste may be further mixed and set aside for one to two hours. The mass may be then evaporated to dryness on a steam bath and then dried in an air oven at or below 100° C. The product appeared to have substantially the same characteristics as indicated in Example I.

In the three examples as given above, the theobromine calcium levulinate obtained is an odorless, granular or amorphous powder, white to grayish white in appearance and of limited solubility. It provides a high diuretic action, a high vasodilator action and is well tolerated with little evidence of undue irritation. A further and important advantage is in its prolonged effect. A still further advantage is in the fact that the compound is substantially non-hygroscopic.

The compounds of the invention may either be used alone or in admixture with other pharmacologically-active ingredients useful in the treatment of cardiovascular disorders. Active ingredients which may be used in conjunction with the compounds of the invention may include metabolism regulating agents such as thiouracil and its derivatives, sedatives, such as barbituric acid derivatives, cardio-active agents such as digitalis or derivatives thereof, and other active agents which extend or enhance the action of the compounds of the invention. In addition, excipients of any desired type may also be used.

The new compounds may be administered orally, in tablets, a particularly suitable size containing about 5 grains of the levulinate, although different sizes or amounts may obviously be used.

Having described our invention, what we claim is:

1. A new composition of matter, comprising a non-toxic alkaline earth salt of theobromine and levulinic acid.

2. As a new composition of matter, theobromine calcium levulinate.

CHARLES J. KERN.
HENRY W. DEL VECCHIO.

REFERENCES CITED

The following references are of record in the file of this patent:

UNITED STATES PATENTS

| Number | Name | Date |
|---|---|---|
| 1,547,698 | Vieth | July 28, 1925 |
| 1,865,111 | Kaufmann | June 28, 1932 |

FOREIGN PATENTS

| Number | Country | Date |
|---|---|---|
| 241,266 | Great Britain | Oct. 14, 1925 |
| 578,487 | Germany | May 24, 1933 |

OTHER REFERENCES

Chemical Abstracts, 20, 1686 (1926).